Oct. 18, 1938.  R. C. JACOBS  2,133,325
ADJUSTABLE VEHICLE SEAT
Filed Dec. 30, 1935    3 Sheets-Sheet 1

INVENTOR
Rex C. Jacobs
BY
ATTORNEYS

Oct. 18, 1938.     R. C. JACOBS     2,133,325
ADJUSTABLE VEHICLE SEAT
Filed Dec. 30, 1935     3 Sheets-Sheet 2
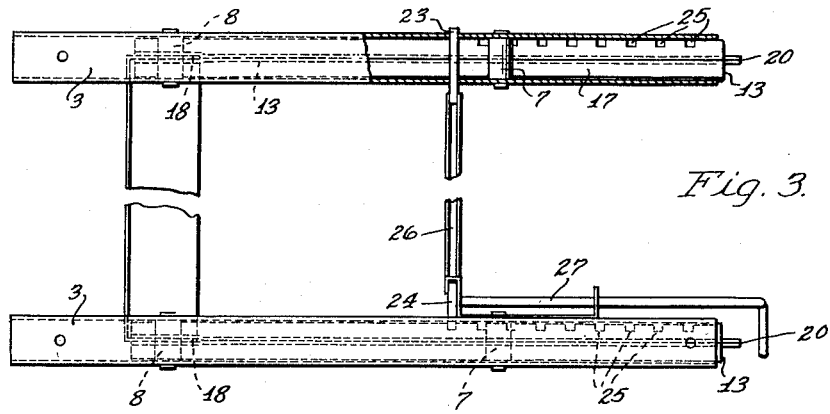
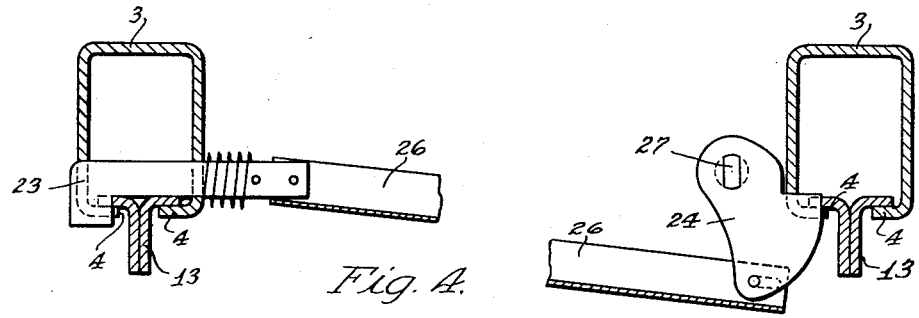
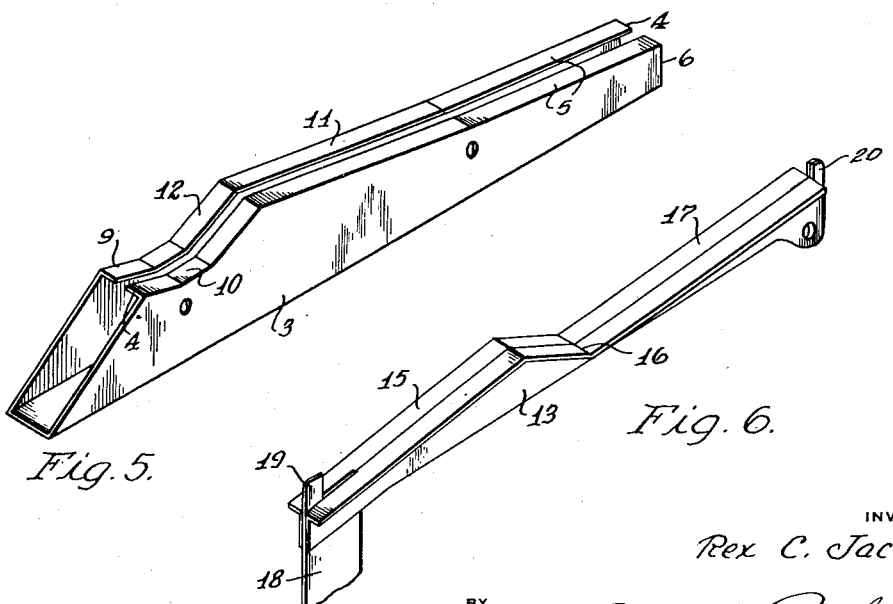
INVENTOR
Rex C. Jacobs
BY
ATTORNEYS Patented Oct. 18, 1938

2,133,325

UNITED STATES PATENT OFFICE 2,133,325

ADJUSTABLE VEHICLE SEAT

Rex C. Jacobs, Detroit, Mich.

Application December 30, 1935, Serial No. 56,603

2 Claims. (Cl. 155—14)

The present invention relates to seats for automotive vehicles, and more particularly to means for supporting the operator's seat whereby such seat may be adjusted to accommodate the varying requirements of different operators.

The primary object of the present invention is to provide means for supporting a vehicle seat so that it may be adjusted in three respects. That is, the seat is traversable forwardly and rearwardly, it may be adjusted to different angular positions, and its height with respect to the floor of the vehicle may be changed.

Another object of the present invention is to provide means for supporting a vehicle seat whereby it may be adjustably moved forwardly and rearwardly with respect to the vehicle and means in combination therewith for causing the rear end of the seat to be elevated with respect to the front end of the seat when incident to the forward movement and for causing the reverse action to take place when the seat is moved rearwardly. To accomplish this object the invention provides rails for slidably supporting the seat, the rails being provided with inclined portions at the rear ends thereof with which means on the rear end of the seat contacts and as the seat is moved forwardly the means on the seat rides up the inclines to elevate the rear end of the seat.

An important object of the present invention is to provide means for supporting a vehicle seat whereby it may be moved forwardly and rearwardly of the vehicle and means in combination therewith which automatically functions incidental to each movement to cause both the front and rear ends of the seat to be elevated, the said means functioning to cause the rear end of the seat to be elevated more rapidly than the front end during such movement whereby the seat is tipped forwardly and elevated simultaneously, the reverse action taking place when the seat is moved rearwardly. This object is accomplished by the provision of rails for slidably supporting the seats, the said rails having inclined rear portions and inclined front portions with the rear inclined portions of greater angularity than the forward portions.

With the above and other ends in view the invention consists in matters hereinafter more particularly pointed out with reference to the accompanying drawings, in which Figs. 1 and 2 are side elevations illustrating different positions of adjustment;

Figure 3 is a plan view of the supporting mechanism with the seat removed, a part being broken away and shown in section;

Fig. 4 is a transverse section illustrating the locking means;

Fig. 5 is a perspective view of a detail;

Fig. 6 is a perspective view of a supporting rail;

Like characters of reference are employed throughout to designate corresponding parts.

Figure 1:
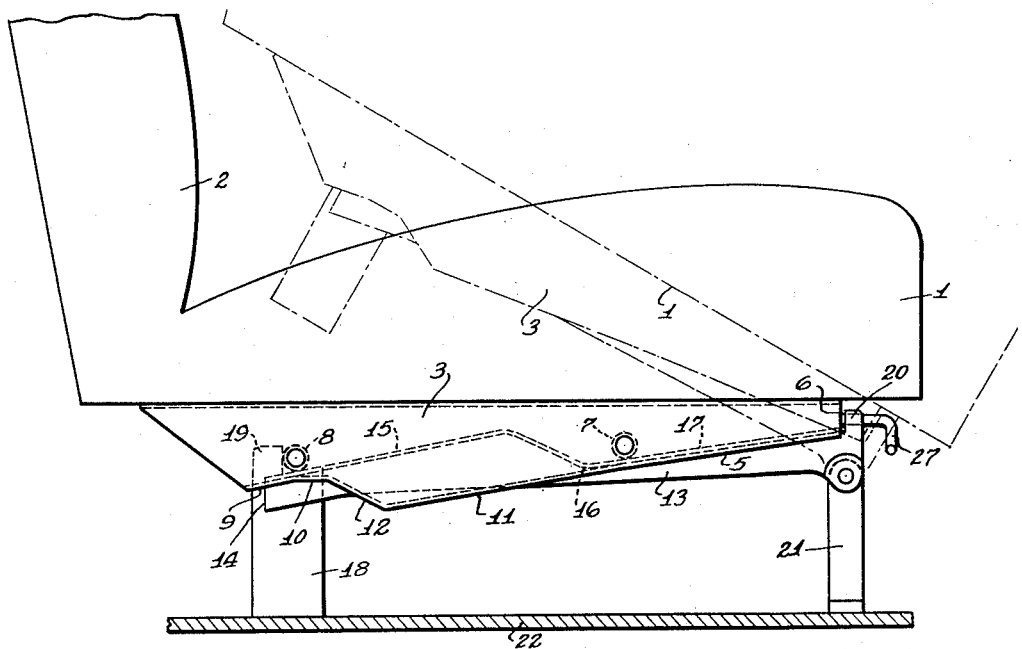

Referring to the drawings the numeral 1 designates an automobile seat having a back rest 2 and inverted channel shaped slides 3 secured to the bottom thereof. The lower edges of the side walls of the channels are turned inwardly to provide flanges 4, the flanges on opposite side walls being parallel, one to the other, and having inclined portions 5 extending rearwardly from the front end 6 thereof. The terminal point of the inclined portion is in approximately the same vertical plane as a roller 7 which is journalled in the side walls of the channel. The flanges 4 also support rollers 8, located adjacent to the rear ends thereof and approximately in vertical alignment with the meeting points of the inclined portions 9 and 10. The flange portions 5 and 10 are united by the downwardly inclined portions 11 and the upwardly inclined portions 12.

Received in each channel slide is a rail 13 comprised of two angle members welded together to provide a T shaped guide. The top surface of the rail is inclined upwardly from the rear end 14 as designated at 15, and the front portion is inclined upwardly from a point 16, located intermediate the ends, to the front end of the rail, as designated at 17. The angle of inclination of the portion 15, with respect to a horizontal plane, is greater than the angle of inclination of the portion 17.

At the rear end of each rail 13 is a bracket 18, welded thereto, and having an upwardly projecting lug 19, the two lugs thus provided serving as abutment means for limiting the movement of the rollers 8 with respect to the inclined portions 15. At their forward ends the rails 13 are provided with lugs 20 which are adapted to be engaged by the rollers 7 to limit their movement in a forward direction. It will thus be seen that when the slides 3 are assembled on the rails 13 with the flanges 4 extending beneath the rails and the rollers 7 and 8 engaging the top surfaces of the rails the parts are retained together and the slides 3 are free to traverse the rails between the limits defined by the lugs 19 and 20.

The forward ends of the rails 13 are pivotally attached to brackets 21 which are secured to the floor 22 of the vehicle.

In order to hold the slides against movement relative to the rails 13 latch elements 23 and 24 are provided on opposite slides to engage in the notches 25 in the rails. The two latch elements are operatively connected by a link 26 so that they may be moved together by an operating shaft 27.

As may be seen by reference to Fig. 1 the seat may be pivoted with respect to the brackets 21, the seat being shown in its tilted position in broken lines. This function is essential for seats in automobiles of the two-door type in order to permit passengers to enter or leave the rear seat compartment.

Figure 2:
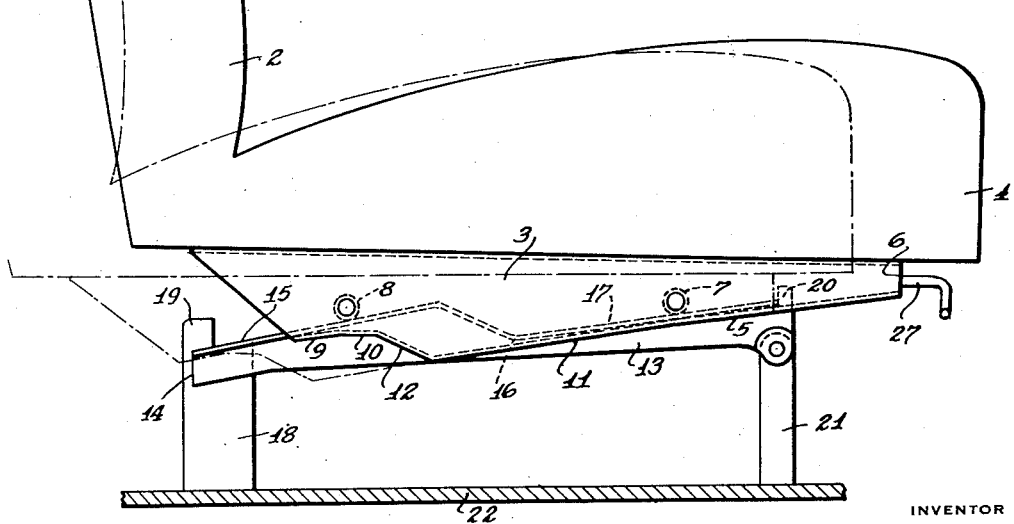

Referring to Fig. 2 the normal position of the seat is shown in broken lines and in full lines is shown the angular position of the seat when it is moved forwardly. As the seat is moved in a forward direction the rollers 8 ride up the inclines 15 and the rollers 7 ride up the inclines 17. Because the inclines 15 are of greater angularity than the inclines 17 the rear end of the seat is elevated more rapidly than the front end with the result that a compound movement of the seat takes place. That is to say, the seat is tilted slightly forward and at the same time it is tilted it is elevated, with the result that instead of the front end lowering as a result of the elevation of the rear end, the front end is also raised. The reverse action takes place when the seat is moved rearwardly.

Figure 7:
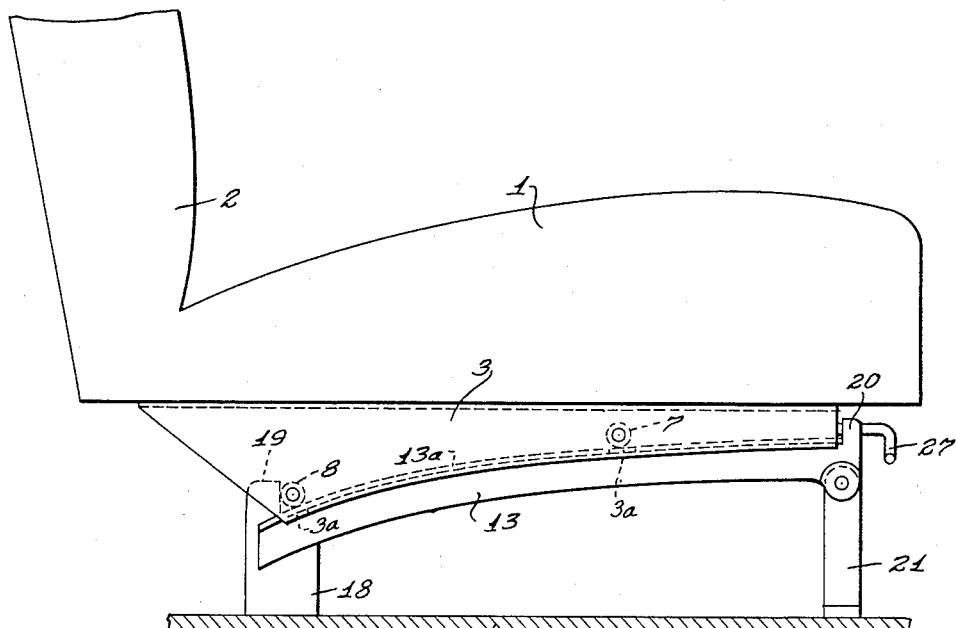
Fig. 7 is a side elevation illustrating a modified form of supporting rail.
Figure 8:
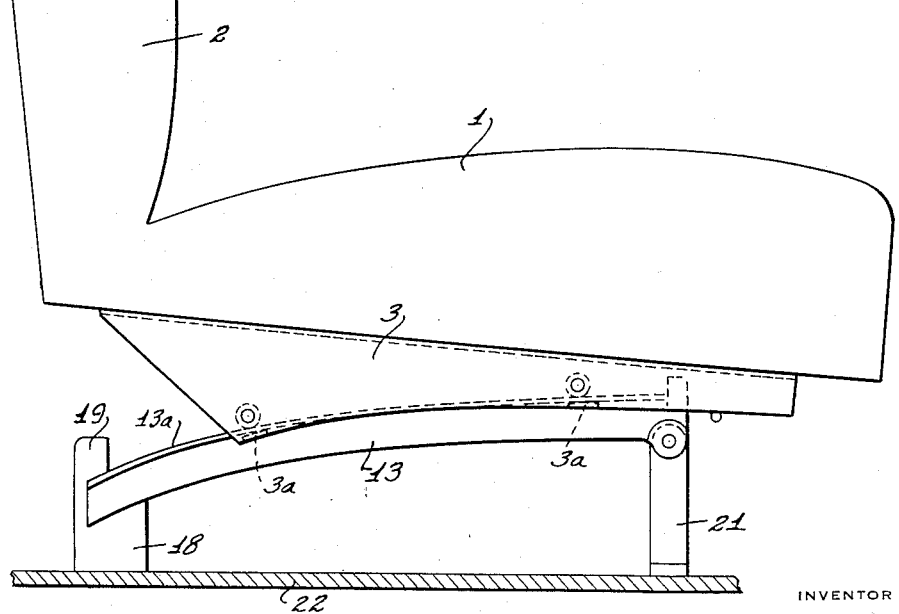
Fig. 8 is a similar view illustrating another position of adjustment.

In Figs. 7 and 8 the construction, with but one exception, is the same as described above and therefore the same reference characters are applied therto. In this form however the flat inclined portions on the rails 13 have been eliminated and the upper surfaces of the rails are curved. It will also be noted that instead of the flanges 4 which extend throughout the entire length of the slides 3 that comparatively short flanges 3a hook under the flanges on the guides 13. The curvature of the upper surfaces of the rails is irregular with the radii progressively increasing as the curve extends from the rear end to the front end of the rail. Thus it will be seen, that as the seat moves forwardly with the rollers 7 and 8 riding along the curved surface 13a the rear end of the seat will be elevated more rapidly than the front end. Thus the seat is tipped and elevated as it is moved forwardly.

Although a specific embodiment of the invention has been illustrated and described it will be understood that various changes may be made within the scope of the appended claims without departing from the spirit of the invention, and such changes are contemplated.

What I claim is:—

1. In combination, a pair of sheet metal guide members having opposed lateral flanges extending throughout the length thereof, the top surfaces of said flanges constituting bearing surfaces, a pair of sheet metal slides adapted to be attached to a seat, said slides each being of channel section having two substantially parallel walls, rollers rotatably journalled between respective pairs of walls and having rolling contact with the bearing surfaces of respective guides, and inwardly directed flanges on said walls extending beneath the flanges on respective guides to maintain said rollers on respective guides to maintain said rollers in rolling contact with said bearing surfaces, the flanges on said guides being formed with fore and aft sections inclined at different angles relative to a reference plane whereby the rollers in traversing said bearing surfaces cause tilting of said slides, and the flanges on said slides having sections angularly disposed whereby portions thereof engage the guide flanges and permit freedom of movement of the slides during said tilting movement.

2. In combination, a pair of sheet metal guide members having opposed lateral flanges extending throughout the length thereof, the top surfaces of said flanges constituting bearing surfaces, a pair of sheet metal slides adapted to be attached to a seat, said slides each being of channel section having two substantially parallel walls, rollers rotatably journalled between respective pairs of walls and having rolling contact with the bearing surfaces of respective guides, and inwardly directed flanges on said walls extending beneath the flanges on respective guides to maintain said rollers on respective guides to maintain said rollers in rolling contact with said bearing surfaces, the flanges on said guides being formed to provide curved bearing surfaces whereby the rollers in traversing the same cause tilting of said slides, and the flanges on said slides being relatively short as compared to the length of the slides and being disposed adjacent the rollers.

REX C. JACOBS.